United States Patent
Yamamoto et al.

(10) Patent No.: US 7,888,586 B2
(45) Date of Patent: Feb. 15, 2011

(54) WIRELESS POWER TRANSFER SYSTEM, POWER TRANSMITTER, AND RECTENNA BASE STATION

(75) Inventors: Atsushi Yamamoto, Tokyo (JP); Hiroyuki Sato, Tokyo (JP); Hiroshi Ikematsu, Tokyo (JP); Koji Namura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 200 days.

(21) Appl. No.: 12/357,692

(22) Filed: Jan. 22, 2009

(65) Prior Publication Data
US 2009/0315412 A1 Dec. 24, 2009

(30) Foreign Application Priority Data
Jun. 20, 2008 (JP) ............................ 2008-161472

(51) Int. Cl.
*H01L 31/042* (2006.01)
(52) U.S. Cl. .................. 136/244; 136/292; 307/149
(58) Field of Classification Search .............. 136/243, 136/244, 292; 307/149; 342/352, 354
See application file for complete search history.

(56) References Cited

U.S. PATENT DOCUMENTS

| | | | | |
|---|---|---|---|---|
| 6,417,803 B1 * | 7/2002 | de La Chapelle et al. | ... | 342/359 |
| 6,492,586 B2 * | 12/2002 | Mikami et al. | ............... | 136/244 |
| 6,492,940 B2 * | 12/2002 | Mikami et al. | ............... | 342/354 |
| 6,495,751 B2 * | 12/2002 | Mikami et al. | ............... | 136/246 |
| 6,528,719 B2 * | 3/2003 | Mikami et al. | ............... | 136/244 |
| 6,967,462 B1 * | 11/2005 | Landis | ........................ | 320/101 |
| 2001/0035207 A1 * | 11/2001 | Mikami et al. | ............... | 136/292 |
| 2002/0029797 A1 * | 3/2002 | Mikami et al. | ............... | 136/244 |
| 2002/0030624 A1 * | 3/2002 | Mikami et al. | ............... | 342/354 |
| 2003/0098057 A1 * | 5/2003 | Mizuno et al. | ............... | 136/244 |

(Continued)

FOREIGN PATENT DOCUMENTS

JP 2002-95190 3/2002

(Continued)

OTHER PUBLICATIONS

Matsumoto, H.; , "Research on solar power satellites and microwave power transmission in Japan," Microwave Magazine, IEEE , vol. 3, no. 4, pp. 36-45, Dec. 2002.*

(Continued)

*Primary Examiner*—Jared J Fureman
*Assistant Examiner*—Daniel Cavallari
(74) *Attorney, Agent, or Firm*—Oblon, Spivak, McClelland, Maier & Neustadt, L.L.P.

(57) ABSTRACT

A wireless power transfer system includes: a plurality of power transmitters, each of which transmits a microwave; and a rectenna base station which receives the microwave to generate power. The rectenna base station includes: a rectenna; and control section which specifies an identification code for identifying each power transmitter and generates a command signal to change a phase of the power transmitter specified by identification code so as to increase a power value received at the rectenna. Each of the power transmitters comprises: a plurality of transmission antenna elements, each of which transmits the microwave to the rectenna base station; and a phase controller which makes phase change of the microwave based on the command signal from the phase monitor and control section of the rectenna base station if the identification code matches a stored identification code.

6 Claims, 9 Drawing Sheets

U.S. PATENT DOCUMENTS

2003/0098058 A1* 5/2003 Takada et al. ............... 136/244
2003/0192586 A1* 10/2003 Takada et al. ............... 136/292
2007/0034247 A1* 2/2007 Takada et al. ............... 136/244

FOREIGN PATENT DOCUMENTS

JP  2003-168912  6/2003
JP  2005-319853  11/2005

OTHER PUBLICATIONS

Rodenbeck, C.T.; Ming-yi Li; Kai Chang; , "A phased-array architecture for retrodirective microwave power transmission from the space solar power satellite," Microwave Symposium Digest, 2004 IEEE MTT-S International , vol. 3, No., pp. 1679-1682 vol. 3, Jun. 6-11, 2004.*

Hsieh, L.H.; Strassner, B.H.; Kokel, S.J.; Rodenbeck, C.T.; Li, M.Y.; Chang, K.; Little, F.E.; Arndt, G.D.; Ngo, P.H.; , "Development of a retrodirective wireless microwave power transmission system," Antennas and Propagation Society International Symposium, 2003. IEEE , vol. 2, No., pp. 393-396 vol. 2, Jun. 22-27, 2003.*

K. Hashimoto and H. Matsumoto, "Microwave beam control system for solar power satellite," in Proc. IEEE Asia-Pacific Radio Sci. Conf., Aug. 2004, pp. 616-617.*

* cited by examiner

FIG. 2A  POSITION, ATTITUDE CHANGE EXAMPLE 1

FIG. 2B  POSITION, ATTITUDE CHANGE EXAMPLE 2

FIG. 2C  POSITION, ATTITUDE CHANGE EXAMPLE 3

WIRELESS POWER TRANSFER SYSTEM, POWER TRANSMITTER, AND RECTENNA BASE STATION

CROSS-REFERENCE TO RELATED APPLICATIONS

This application is based upon and claims the benefit of priority from Japanese Patent Application No. 2008-161472, filed Jun. 20, 2008, the entire contents of which are incorporated herein by reference.

BACKGROUND OF THE INVENTION

1. Field of the Invention

This invention relates to a wireless power transfer system for receiving sunlight, executing photoelectric conversion of the sunlight to generate power, transmitting a microwave generated based on the power from a plurality of transmitters, receiving the microwave by a receiver, and generating power, and a power transmitter and a rectenna base station used in the wireless power transfer system.

2. Description of the Related Art

For example, JP-A-2005-319853 describes a related-art wireless power transfer system for executing power transfer with a microwave from a power generating satellite placed on orbit in space to a ground receiver. In the related-art wireless power transfer system, a pilot signal transmitted from a rectenna base station is received in the power generating satellite and a pilot reply signal is transmitted to the rectenna base station. The pilot signal is subjected to spread spectrum modulation and is identified for each satellite and a reference phase is taken out. On the other hand, the pilot reply signal is also subjected to spread spectrum modulation and in the rectenna base station, the phase information of each pilot reply signal is extracted and the phase delay of each power generating satellite is found and a feedback system of reflecting the phase delay on the phase of the pilot signal is formed, whereby the phases of the microwaves from the power generating satellites are made uniform and larger power is provided.

According to the wireless power transfer system described in JP-A-2005-319853, the ground rectenna base station needs a circuit for executing spread spectrum modulation of the pilot signal to be transmitted and executing inverse spread spectrum demodulation of the received pilot reply signal and a circuit for comparing the phases of the pilot reply signals for each satellite provided by executing the inverse spread spectrum modulation and feeding back to match the phases and involves a problem of an increase in the facilities. Each satellite in orbit also needs a circuit for executing inverse spread spectrum demodulation of the pilot signal and executing spread spectrum modulation of the pilot reply signal for generation and involves a problem of an increase in the circuit scale; in addition, power for driving the circuitry becomes necessary and a part of power generated by photoelectric conversion is consumed by the circuit involved in the pilot signal and the whole power generation efficiency is degraded; this is also a problem.

SUMMARY OF THE INVENTION

It is therefore an object of the invention to provide a wireless power transfer system, a power transmitter, and a rectenna base station capable of more efficiently making uniform phases of microwaves transmitted from transmitters when the microwaves are received in the rectenna base station without incurring an increase in the circuit scale.

According to an embodiment of the present invention, there is provided a wireless power transfer system including: a plurality of power transmitters, each of which transmits a microwave; and a rectenna base station which receives the microwave to generate power. The rectenna base station includes a rectenna which receives the microwave; a pilot signal transmission antenna which transmits a pilot signal to the power transmitters; and a phase monitor and control section which specifies an identification code for identifying each power transmitter and generates a command signal to change a phase of the power transmitter specified by identification code so as to increase a power value received at the rectenna. Each of the power transmitters includes: a plurality of transmission antenna elements, each of which transmits the microwave to the rectenna base station; a pilot signal reception antenna which receives the pilot signal; a tracking receiver which detects an arrival direction of the pilot signal received at the pilot signal reception antenna; a beam drive control section which performs phase adjustment so that the microwave transmitted from the plurality of transmission antenna elements points in the arrival direction of the pilot signal detected by the tracking receiver; and a phase controller which makes phase change of the microwave based on the command signal from the phase monitor and control section of the rectenna base station if the identification code matches a stored identification code.

According to another embodiment of the present invention, there is provided a rectenna base station which receives and combines a microwave transmitted from each of a plurality of power transmitters to generate power. The rectenna base station includes: a rectenna which receives the microwave; a pilot signal transmission antenna which transmits a pilot signal to the power transmitters; and a phase monitor and control section which specifies an identification code for identifying each of the power transmitters and generates a command signal to change a phase of the power transmitter identified by the identification code so as to increase a power value received at the rectenna.

According to a further embodiment of the present invention, there is provided, a power transmitter which transmits a microwave to a rectenna base station. The power transmitter includes: a plurality of transmission antenna elements, each of which transmits a microwave to the rectenna base station; a pilot signal reception antenna which receives a pilot signal from the rectenna base station; a tracking receiver which detects an arrival direction of the pilot signal received at the pilot signal reception antenna; a beam drive control section which performs phase adjustment so that the microwave transmitted from the plurality of transmission antenna elements points in the arrival direction of the pilot signal detected by the tracking receiver; and a phase controller which makes phase change of the microwave based on a command signal, which specifies an identification code and is transmitted from the rectenna base station for changing the phase of the microwave, if the specified identification code matches a stored identification code.

According to the above configuration, the rectenna base station specifies the identification code of the power transmitter and generates a phase change command signal so as to increase the power value of the received microwave, and if the identification code specified in the command signal matches the identification code of the power transmitter, the power transmitter changes the phase of the microwave to be transmitted, so that an increase in the circuit scale can be suppressed. Additionally, the command signal is superposed on a pilot signal for transmission, so that the command signal reception system of the power transmitter can be implemented using the pilot signal reception system.

BRIEF DESCRIPTION OF THE DRAWINGS

The above and other aspects of the present invention will become more apparent and more readily appreciated from the following description of exemplary embodiments of the present invention taken in conjunction with the attached drawings, in which.

DETAILED DESCRIPTION OF THE INVENTION

First Embodiment 1

Figure 1A:
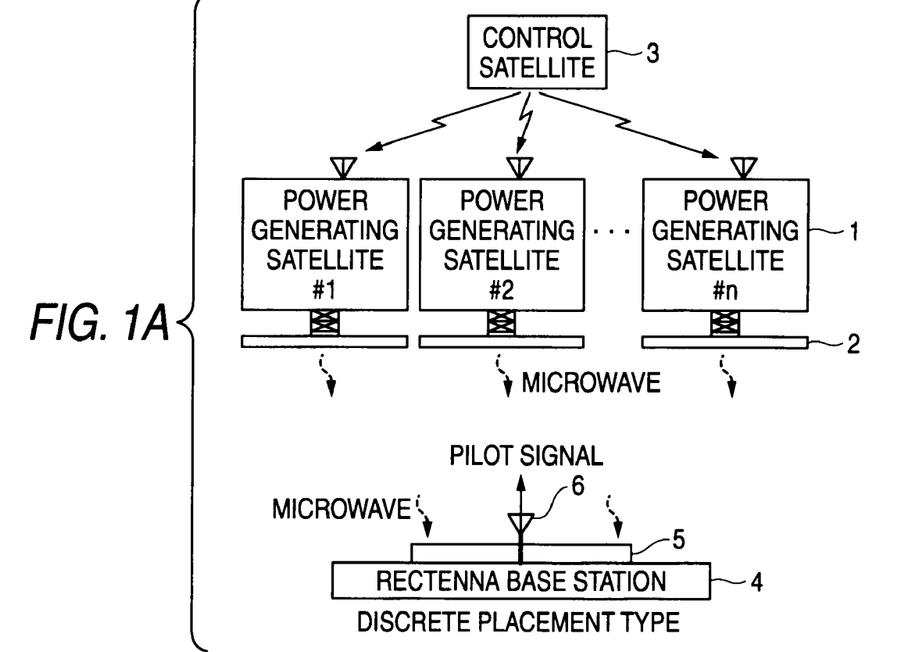
FIGS. 1A and 1B are configuration drawings of a wireless power transfer system according to a first embodiment of the invention.
Figure 1B:
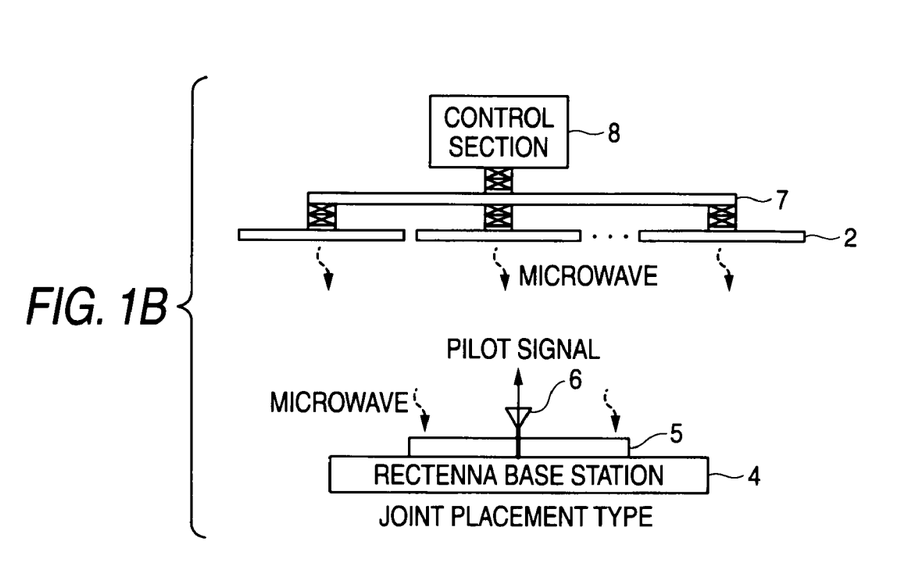

A wireless power transfer system, a power transmitter, and a rectenna base station according to a first embodiment of the invention will be discussed with FIGS. 1A to 6. FIGS. 1A and 1B are configuration drawings of the wireless power transfer system according to the first embodiment of the invention; FIG. 1A represents the case where a microwave is transmitted from power transmitters provided in discretely placed power generating satellites and FIG. 1B represents the case where a microwave is transmitted from power transmitters joined mechanically. The transmission unit containing the power transmitter in FIG. 1B can be placed in space, on the earth, in the stratosphere, etc. In FIG. 1A, numeral 1 denotes a power generating satellite for receiving sunlight, executing photoelectric conversion of the sunlight to generate power, and transmitting the power with a microwave, and numeral 2 denotes a power transmitter provided in each of the power generating satellites 1. Numeral 3 denotes a control satellite for controlling the power generating satellites 1 and the power transmitters 2. The control satellite 3 transmits and receives a control signal and a response signal mainly to and from each power generating satellite 1 for control and also transmits a reference signal to each power generating satellite 1 (and power transmitter 2). Numeral 4 denotes a rectenna base station for receiving a microwave from the power transmitter 2 and generating power, numeral 5 denotes a rectenna made up of microwave reception antennas, and numeral 6 denotes a pilot signal transmission antenna for transmitting a pilot signal to the power transmitter 2. The rectenna 5 and the pilot signal transmission antenna 6 form a part of the rectenna base station 4. In FIG. 1B, numeral 7 denotes a mechanical structure for joining a plurality of power transmitters 2 and numeral 8 denotes a control section for controlling the power transmitters 2. The control section 8 transmits and receives a control signal and a response signal to and from each power transmitter 2 for controlling the power transmitters 2 and also supplies a reference signal to each power transmitter 2.

Figure 2A:
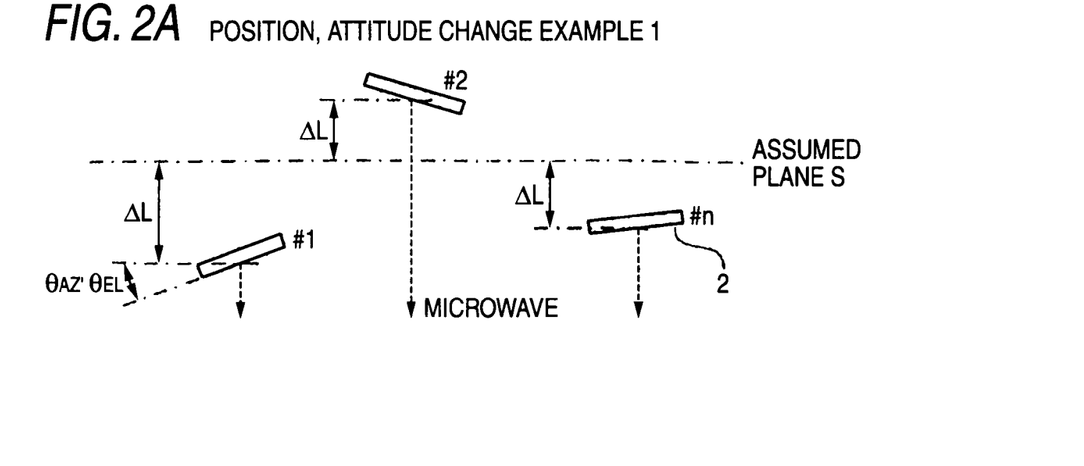
FIGS. 2A to 2C are schematic drawings to represent position and attitude change examples of power transmitters.
Figure 2B:
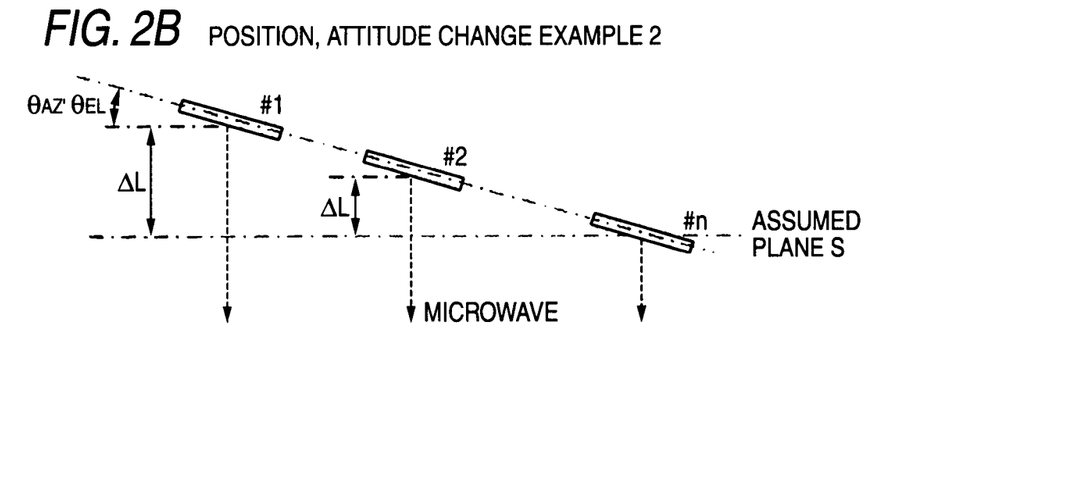
Figure 2C:
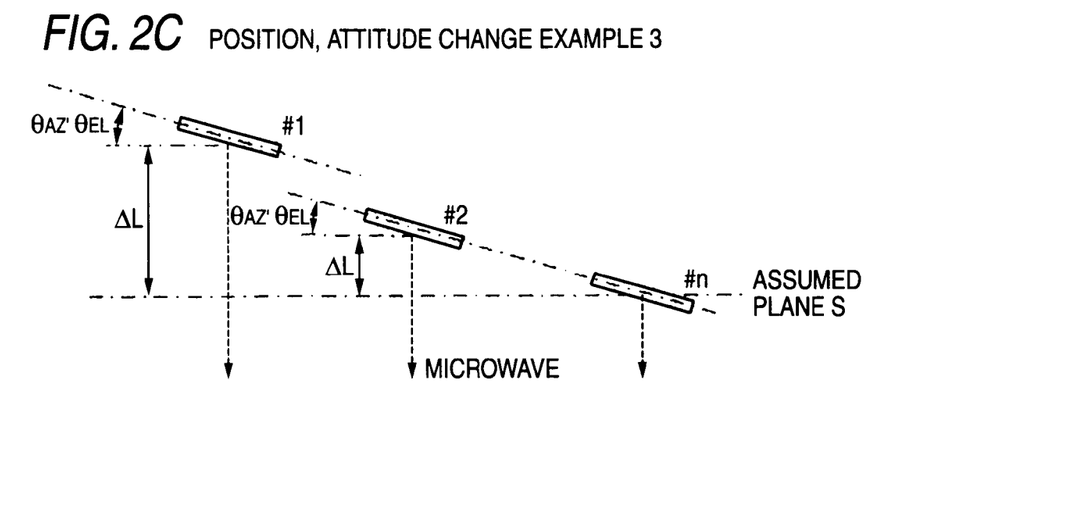

Each power transmitter 2 transmits a microwave to the rectenna base station 4 and the microwaves are received at the rectenna 5 in the rectenna base station 4 and are combined. If the microwaves are out of phase at the receiving time at the rectenna 5, the power generated in the rectenna base station 4 lowers. Such a phase shift is caused by a phase shift of the reference signal used as the reference of the microwave generated in each power transmitter 2 or position change or attitude change of each power transmitter 2 (particularly, transmission panel portion). FIGS. 2A to 2C show position and attitude change examples of the power transmitters 2; FIG. 2A shows the case where n power transmitters 2 move almost independently of each other and the position or attitude change and there is a possibility that the case may noticeably occur if the plurality of power generating satellites 1 shown in FIG. 1A are used. FIG. 2B shows the case where n power transmitters 2 move in one body and position change is caused to occur and there is a possibility that the case may noticeably occur if the mechanical structure 7 shown in FIG. 1B is assumed almost to be a rigid body. FIG. 2C shows the case where position or attitude change occurs in some of n power transmitters 2 and there is a possibility that the case may noticeably occur if the mechanical structure 7 shown in FIG. 1B is not a rigid body and is formed as a soft structure.

In FIGS. 2A to 2C, attitude change occurring in each power transmitter 2 is represented as azimuth direction angle change $\theta_{AZ}$, elevation angle direction angle change $\theta_{EL}$ and position change is represented as distance $\Delta L$ from one virtual plane S. As attitude change ($\theta_{AZ}$, $\theta_{EL}$) occurs, the direction of the microwave transmitted from each power transmitter 2 shifts from the direction of the rectenna 5 and thus a pilot signal is used to correct the shift. That is, each power transmitter 2 receives a pilot signal and finds the arrival direction of the pilot signal and is controlled so that the transmission direction of the microwave is directed to the arrival direction of the pilot signal. As position change $\Delta L$ occurs, in the microwave transmitted from each power transmitter 2, a phase shift as much as the change $\Delta L$ occurs for each power transmitter. A configuration for correcting the phase shift caused by the position change $\Delta L$ needs to be examined.

Figure 3:
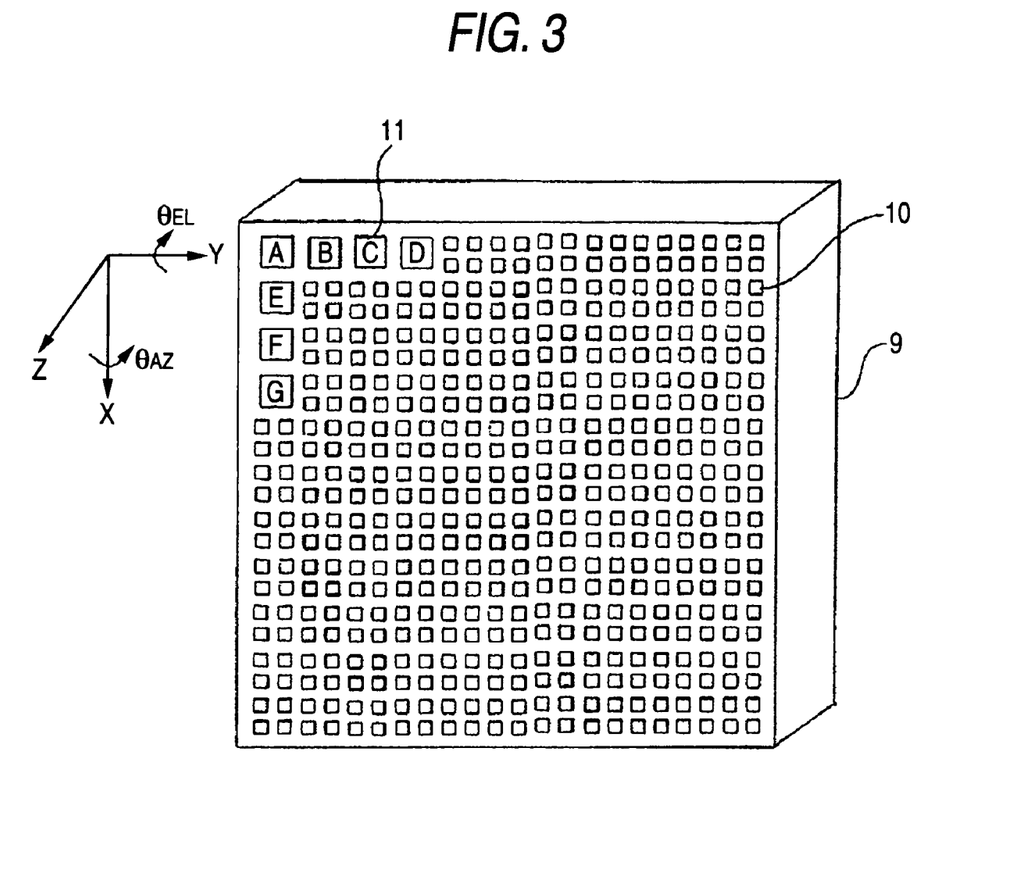
FIG. 3 is an outline drawing to show the outer shape of a transmission panel of the power transmitter.
Figure 4:
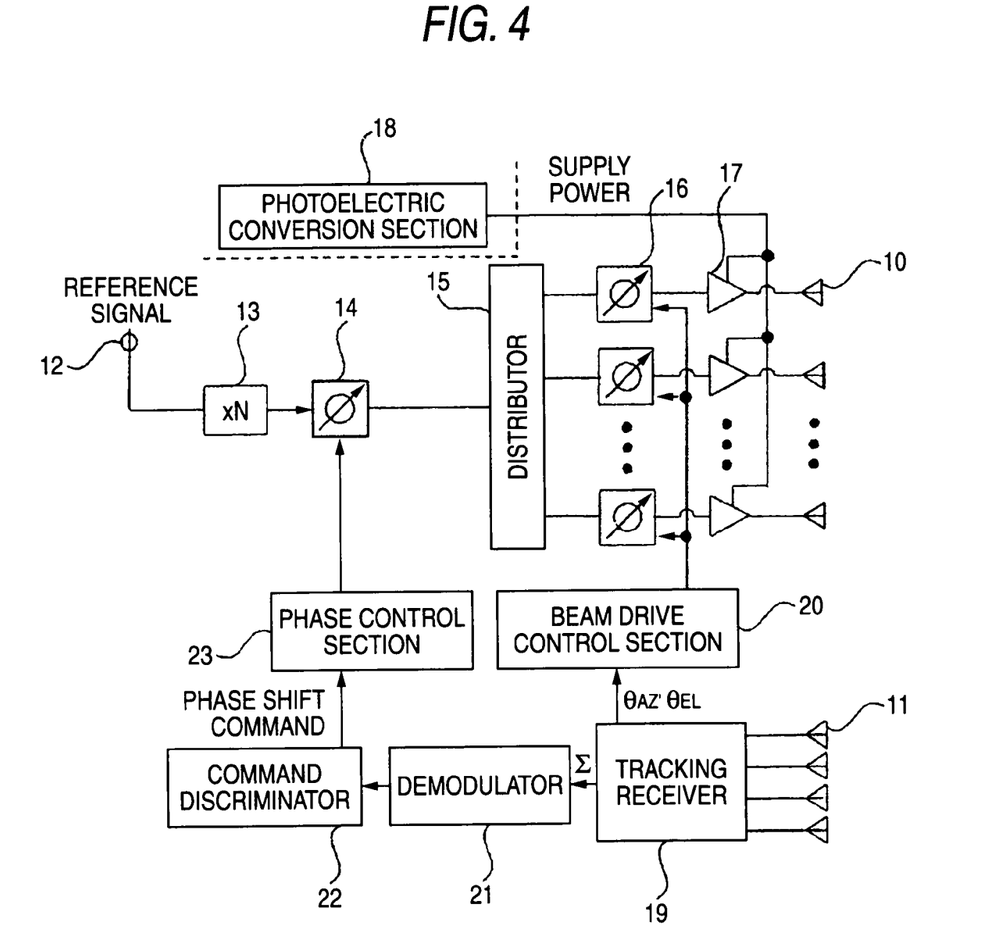
FIG. 4 is a functional block diagram to show the configuration of the power transmitter.

Next, the configurations of the power transmitter and the rectenna base station according to the first embodiment of the invention will be discussed based on FIGS. 3 to 5. FIG. 3 is an outline drawing of a transmission panel of the power transmitter 2. In the figure, numeral 9 denotes a base board, numeral 10 denotes a transmission antenna element for transmitting a microwave, and numeral 11 denotes a pilot signal reception antenna for receiving a pilot signal. The transmission antenna elements 10 are placed as an array on the plane of the base board 9 and receive microwave feeding with a feeding line provided in the base board. FIG. 4 is a functional block diagram to show the configuration of the power transmitter 2. In FIG. 4, numeral 12 denotes an input terminal of a reference signal input from the control satellite 3 or the control section 8, numeral 13 denotes a multiplier for multiplying the reference signal and outputting a carrier signal, numeral 14 denotes a phase shifter for adjusting the phase of the carrier signal, numeral 15 denotes a power divider for distributing the carrier signal, numeral 16 denotes a phase shifter for adjusting the phase of the distributed carrier signal, and numeral 17 denotes an amplifier for amplifying the carrier signal. Numeral 18 denotes a photoelectric conversion section. Power generated in the photoelectric conversion section is input to the amplifier 17 and a microwave at a predetermined power level is generated and is radiated to space from the transmission antenna elements 10 connected to the amplifier 17. The amplifiers 17 and the transmission antenna elements 10 may be connected in a one-to-one correspondence or a plurality of transmission antenna elements 10 may be connected one amplifier 17 like 1:4. Numeral 19 denotes a tracking receiver for finding the arrival direction of a pilot signal ($\theta_{AZ}$, $\theta_{EL}$) based on a sum signal and a difference signal obtained from the pilot signal reception antenna 11, and numeral 20 denotes a beam drive control section for finding the phase amount of each phase shifter 16 so that the microwave transmitted from the transmission antenna elements 10 points in the arrival direction of a pilot signal ($\theta_{AZ}$, $\theta_{EL}$) and setting a phase in each phase shifter 16 according to the found phase amount. Numeral 21 denotes a demodulator for demodulating a command signal from the sum signal of the pilot signal received by the tracking receiver 19, numeral 22 denotes a command discriminator for making a comparison between an identification code assigned to the power transmitter 2 (it is assumed that the identification code is stored as the identification code of the power transmitter) and an identification code contained in the command signal demodulated by the demodulator 21 and detected and outputting a phase shift command if they match, and numeral 23 denotes a phase control section for setting a phase in the phase shifter 14.

Figure 5:
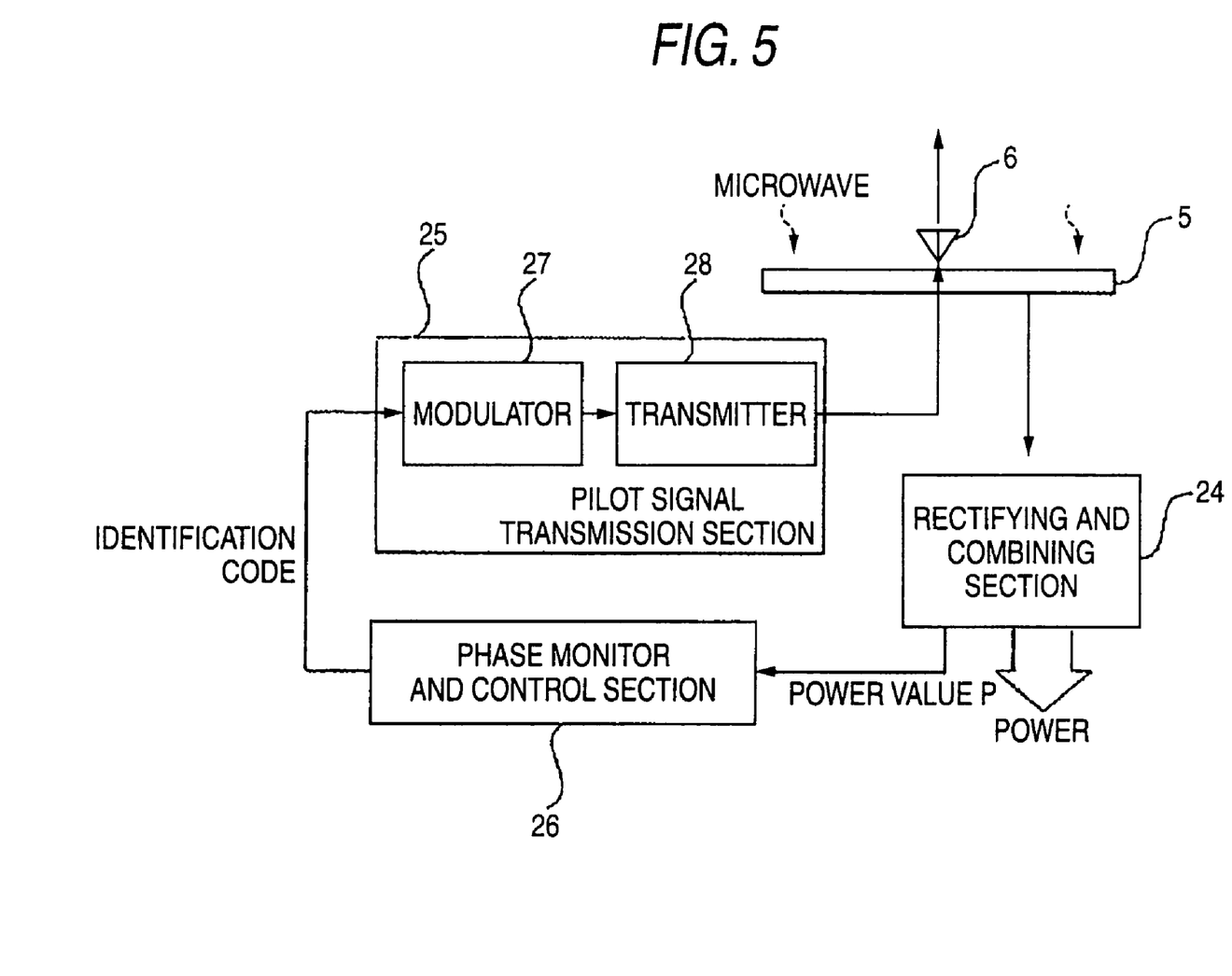
FIG. 5 is a functional block diagram to show the configuration of a rectenna base station.

FIG. 5 is a functional block diagram to show the configuration of the rectenna base station. In FIG. 5, numeral 24 denotes a rectifying and combining section for rectifying and combining microwaves received at the rectenna 5 to generate power, numeral 25 denotes a pilot signal transmission section for generating and outputting a pilot signal, and numeral 26 denotes a phase monitor and control section for monitoring a power value P and performing phase control of each power transmitter 2. In the pilot signal transmission section 25, numeral 27 denotes a modulator for modulating the carrier wave of a pilot signal according to a command signal output from the phase monitor and control section 26 (containing the identification code of the power transmitter 2 to be controlled), and numeral 28 denotes a transmitter for amplifying, etc., a pilot signal and outputting the amplified pilot signal to the pilot signal transmission antenna 6.

The operation is as follows: A pilot signal transmitted from the pilot signal transmission antenna 6 of the rectenna base station 4 is received at the pilot signal reception antenna 11 of the power transmitter 2. FIG. 3 shows a configuration example of the pilot signal reception antenna 11; in this example, the pilot signal reception antenna 11 is made up of seven antenna elements of A to G. Now, letting the signals received at the antenna elements A to G be Sa to Sg, the tracking receiver 19 combines the signals received at the pilot signal reception antenna 11 to generate AZ direction sum signal Sa+Sb+Sc+Sd and difference signal Sa+Sb−Sc−Sd and EL direction sum signal Sa+Se+Sf+Sg and difference signal Sa+Se−Sf−Sg. Using the nature that the values of the sum signal and the difference signal change as the AZ direction and the EL direction of the pilot signal change, the tracking receiver 19 finds and outputs $\theta_{AZ}$ and $\theta_{EL}$ of the arrival direction of the pilot signal. The beam drive control section 20 calculates the phase amount to be set in each phase shifter 16 to transmit a microwave in the ($\theta_{AZ}$, $\theta_{EL}$) direction of the arrival direction of the pilot signal and sets the phase amount in the phase shifter 16. Such operation is performed, whereby the shift between the direction of the rectenna 5 of the rectenna base station 4 and the direction of the microwave transmitted from the power transmitter caused by attitude change of position and attitude change shown in FIGS. 2A to 2C is corrected. The configuration and the layout (composition) of the pilot signal reception antenna 11 are not limited to those shown in FIG. 3 and may be any if the pilot signal reception antenna 11 can be used for the tracking reception as described above.

Figure 6:
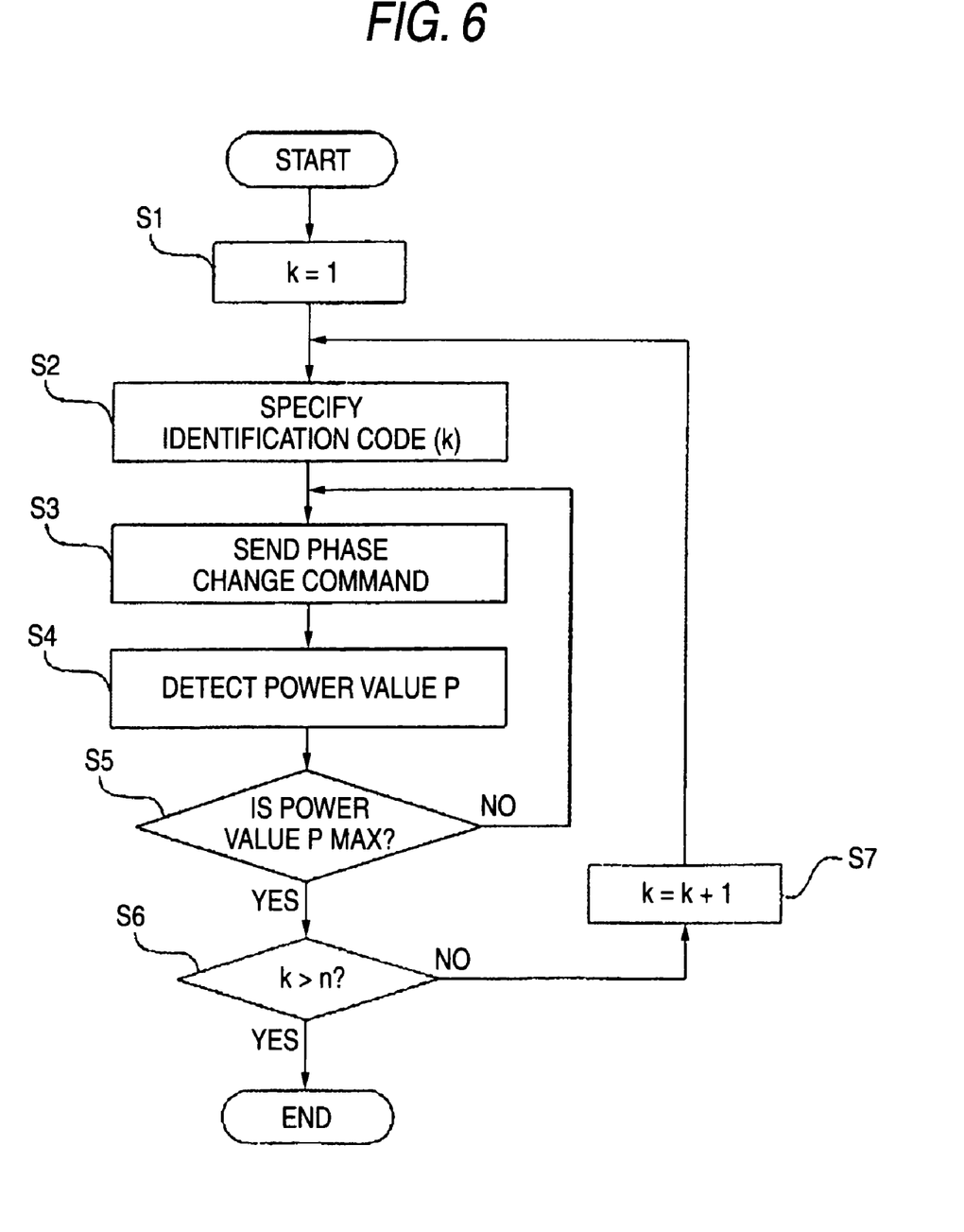
FIG. 6 is a flowchart to show a processing sequence for performing phase adjustment of the power transmitters.

Next, processing of correcting the phase shift between the power transmitters 2 caused by the position change ΔL shown in FIGS. 2A to 2C will be discussed based on FIG. 6. FIG. 6 is a flowchart to show a processing sequence for performing phase adjustment of the power transmitters. This processing is performed by the phase monitor and control section 26 of the rectenna base station 4. Now, assuming that the number of the power transmitters 2 is n, first the phase monitor and control section 26 in the rectenna base station 4 sets a variable number k to 1 at step S1 and specifies the identification code 1 of the power transmitter 2 corresponding to variable number k=1 at step S2. At step 3, the phase monitor and control section 26 transmits a phase change command signal (containing the specified identification code) from the rectenna base station 4. The power transmitter 2 having the matched identification code changes the phases of the whole transmission panel uniformly a predetermined amount based on the command signal. As the change is made, the power value P received at the rectenna 5 of the rectenna base station 4 changes and at step S4, the power value P is detected. The phase monitor and control section 26 determines whether or not the power value P becomes the maximum value, and sends a phase change command signal repeatedly to the power transmitter 2 specified so as to increase the power value P. When it is determined at step S5 that the power value P becomes the maximum value, the phase adjustment of the power transmitter 2 specified as k=1 is completed. At step S6, the phase monitor and control section 26 determines whether or not the variable number k exceeds n. If the variable number k does not exceed n, k is incremented by one and phase adjustment of another power transmitter 2 is started. This sequence is repeated for each power transmitter 2, whereby the phases of the microwaves transmitted from the power transmitters 2 and received at the rectenna 5 are made uniform and the power to be generated can be made the maximum or a value close to the maximum.

The phase monitor and control section 26 may change phase 0 degrees to 360 degrees every predetermined angle, previously detect the power value P at each angle, and give a command so as to set the phase at the angle at which the power value P becomes the maximum to obtain the phase value at which the power value P becomes the maximum at steps S3 to S5 or may describe the phase change direction (plus or minus) in the command signal for changing the phase, perform step drive of the phase of the power transmitter in the direction in which the detected power value P increases, and terminate the command at the point where the power value P reaches the maximum.

In the rectenna base station 4 shown in FIG. 5, the phase monitor and control section 26 specifies the identification code of the power transmitter 2 corresponding to the variable number k (step S2) and outputs a command signal containing the identification code to the modulator 27, which then superposes the command signal on a pilot signal and the resultant signal is amplified and transmitted by the transmitter 28, whereby step S3 "SEND PHASE CHANGE COMMAND" is executed. In the power transmitter 2 shown in FIG. 4, the sum signal received at the pilot signal reception antenna 11 and combined by the tracking receiver 19 is demodulated, the command signal (containing the identification code) superposed on the pilot signal is reproduced, the command discriminator 22 compares the identification code contained in the command signal with the previously stored identification code and outputs a phase shift command if they match, and upon reception of the command, the phase control section 23 changes the phase of the phase shifter 14. The command signal is made up of a command code and the specified identification code of the power transmitter, but if the command signal is a dedicated command, no command code may exist.

As described above, the phases of the power transmitters 2 are changed one after another based on the command from the rectenna base station 4, the power value P is detected in the rectenna base station 4, and phase adjustment is performed so as to increase the power value P, whereby the microwave phase shift accompanying the position change ΔL shown in FIGS. 2A to 2C can be corrected, the phase of the reference signal supplied to each power transmitter 2 is also included and corrected by the phase adjustment, the phase shift from each power transmitter 2 is corrected, and larger power can be obtained in the rectenna base station 4. A spread spectrum modulator and a transmitter for transmitting a pilot reply signal to a power generating satellite as disclosed in the related art need not be provided, so that an increase in the circuit scale can be suppressed, light weight can be achieved, and the reliability of the apparatus can be improved. The command signal is superposed on the pilot signal for transmission, whereby the command signal reception system of the power transmitter can be implemented using the pilot signal reception system and the circuit scale can be further reduced.

Second Embodiment

A wireless power transfer system, a power transmitter, and a rectenna base station according to a second embodiment of the invention will be discussed with FIG. 7. The power transmitter and the rectenna base station according to the second embodiment of the invention have the configurations and the functions equal to those previously described with reference to FIGS. 3 to 5 in the first embodiment. A processing sequence for performing phase adjustment of the power transmitters in the second embodiment different from that in the first embodiment will be discussed based on FIG. 7.

Figure 7:
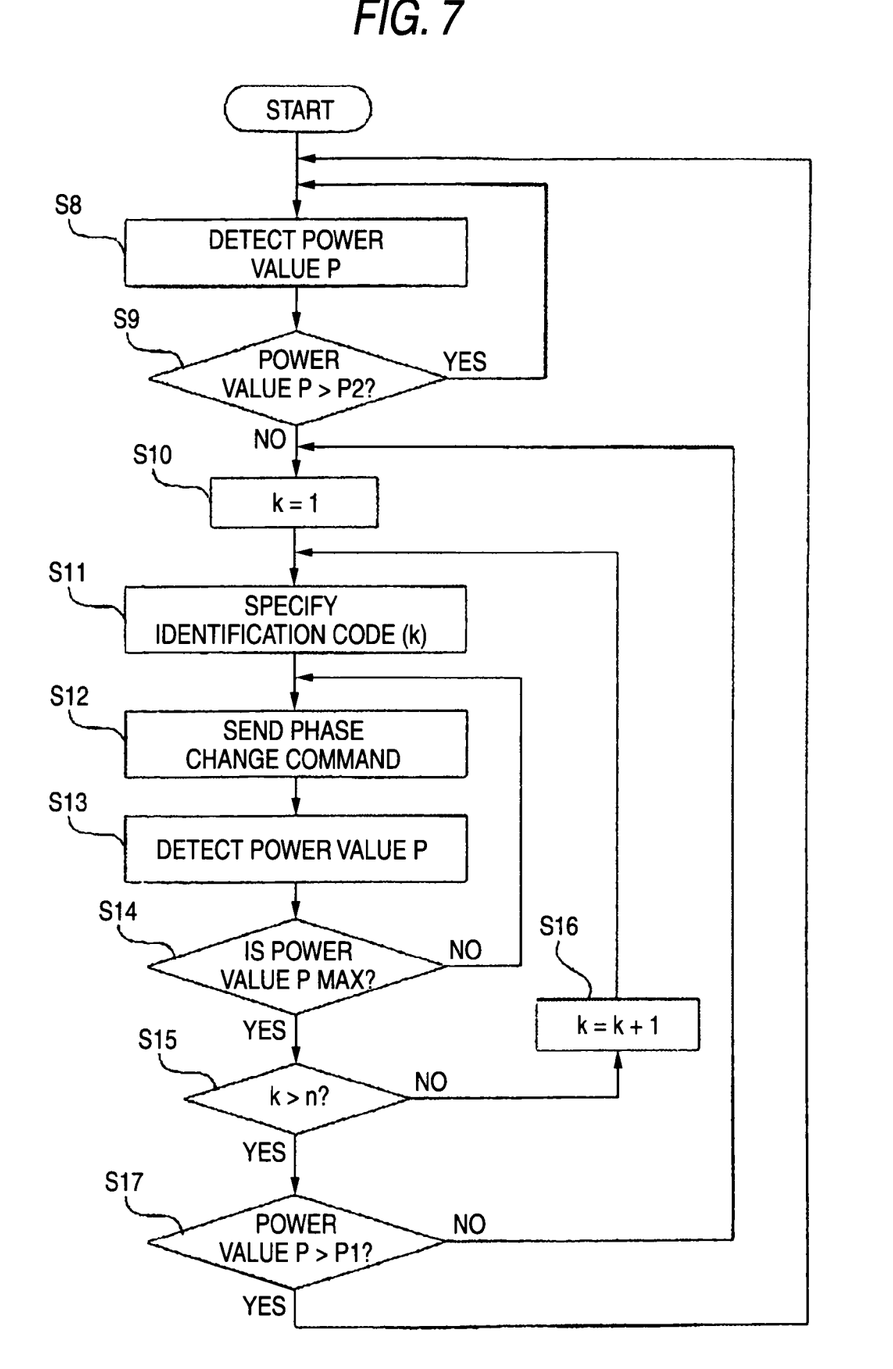
FIG. 7 is a flowchart to show a processing sequence for performing phase adjustment of power transmitters according to a second embodiment of the invention.

FIG. 7 is a flowchart to show a processing sequence for performing phase adjustment of the power transmitters according to the second embodiment of the invention. This processing is performed by a phase monitor and control section 26 of the rectenna base station 4. It is also assumed in the processing flow that the number of the power transmitters 2 is n. At step S8, the phase monitor and control section 26 in the rectenna base station 4 detects power value P received and obtained at a rectenna 5. At step S9, the phase monitor and control section 26 determines whether or not the detected power value P is greater than a lower threshold value P2. If the power value P is greater than the lower threshold value P2, it is assumed to be within the allowable range, and steps S8 and S9 are repeated. If the detected power value P becomes equal to or less than the lower threshold value P2, the process goes to step S10 and phase adjustment is started. The sequence at steps S10 to S16 is the same as that at steps S1 to S7 previously described with reference to FIG. 6 in the first embodiment and therefore will not be discussed again. The sequence at steps S10 to S16 is executed, whereby phase adjustment of the n power transmitters 2 is repeated in sequence for each power transmitter, the phases of the microwaves transmitted from the n power transmitters 2 and received at the rectenna 5 are made uniform and the power to be generated can be made the maximum or a value close to the maximum. Upon completion of the phase adjustment of the n power transmitters 2, the process goes to step S17 and whether or not the power value P detected at the phase adjustment completion time is greater than an upper threshold value P1 is determined. If the power value P is greater than the upper threshold value P1, it is determined that good phase adjustment can be accomplished, and the process returns to step S8. If the power value P is equal to or less than the upper threshold value P1, the process returns to step S10 to again perform phase adjustment.

The upper threshold value P1 and the lower threshold value P2 are set to predetermined values in response to the performance of the system to be constructed. The maximum value of power of microwaves emitted to space by the power transmitters 2 can be estimated considering the efficiency of the photoelectric conversion section 18 and the amplifier 17 shown in FIG. 4, the loss in the transmission line, the directional gain of the transmission panel, etc. Further, the theoretical maximum value of power provided by receiving and combining the microwaves transmitted the power transmitters 2 at the rectenna 5 can also be found by conducting an appropriate analysis according to the phase uniform condition. The capability value is found considering the factors of the phase resolution in each power transmitter 2, change in the directional gain of the transmission panel caused by the microwave transmission direction shift, etc., for the theoretical maximum value. For example, the capability value is set to the upper threshold value P1 and the minimum power generating capability value required for the system is set to the lower threshold value P2. More specifically, considering each capability value, for example, 90% level of the theoretical maximum value of the combined power may be set to the upper threshold value P1 and 80% level may be set to the lower threshold value P2.

The upper threshold value P1 and the lower threshold value P2 may be again set appropriately at the operating time. If the detection value of the power value P after the actual phase adjustment becomes almost a specific value more than once, the value is grasped as the maximum capability of the actual hardware. Therefore, the specific value may be adopted as the maximum value and 90% level of the maximum value may be set to the upper threshold value P1 and 80% level may be set to the lower threshold value P2.

Figure 8:
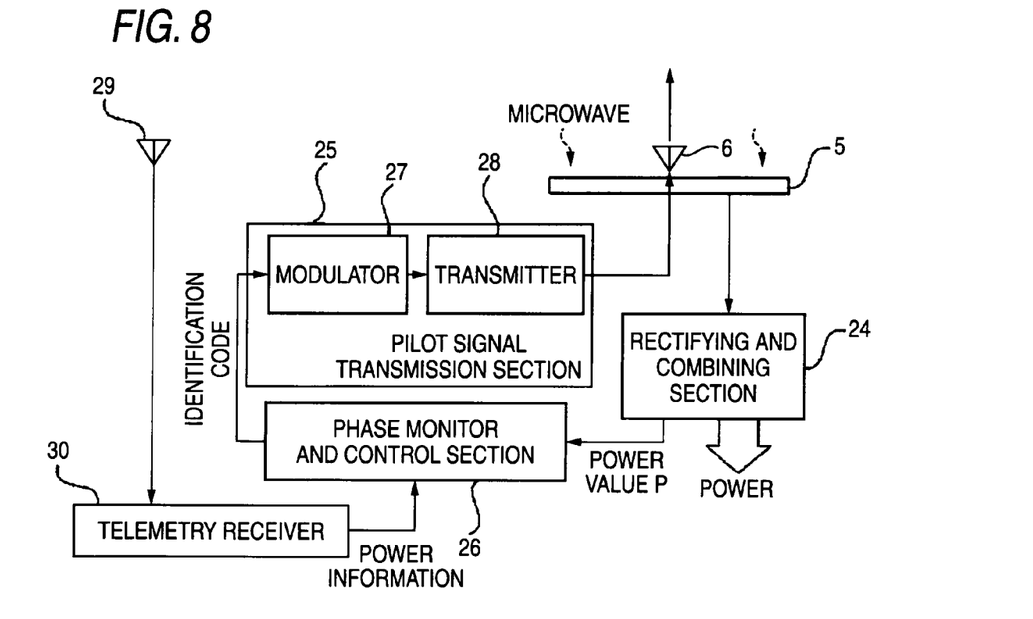
FIG. 8 is a functional block diagram to show another configuration example of the rectenna base station.

FIG. 8 shows another configuration example of the rectenna base station 4 when power information monitored by the photoelectric conversion section 18 is sent from the power transmitter 2 or a control satellite 3 (or a control section 8) to the rectenna base station 4 using a communication line. In this case, in the rectenna base station 4, the power information is received at a reception antenna 29 and is demodulated and reproduced by a telemetry receiver 30 and is output to the phase monitor and control section 26. The phase monitor and control section 26 can know the power maximum value obtained at the point in time based on the power information and may again set the upper threshold value P1 and the lower threshold value P2 described above. Circuits and parts identical with or similar to those previously described with reference to FIG. 5 are denoted by the same reference numerals in FIG. 8.

Third Embodiment

Figure 9:
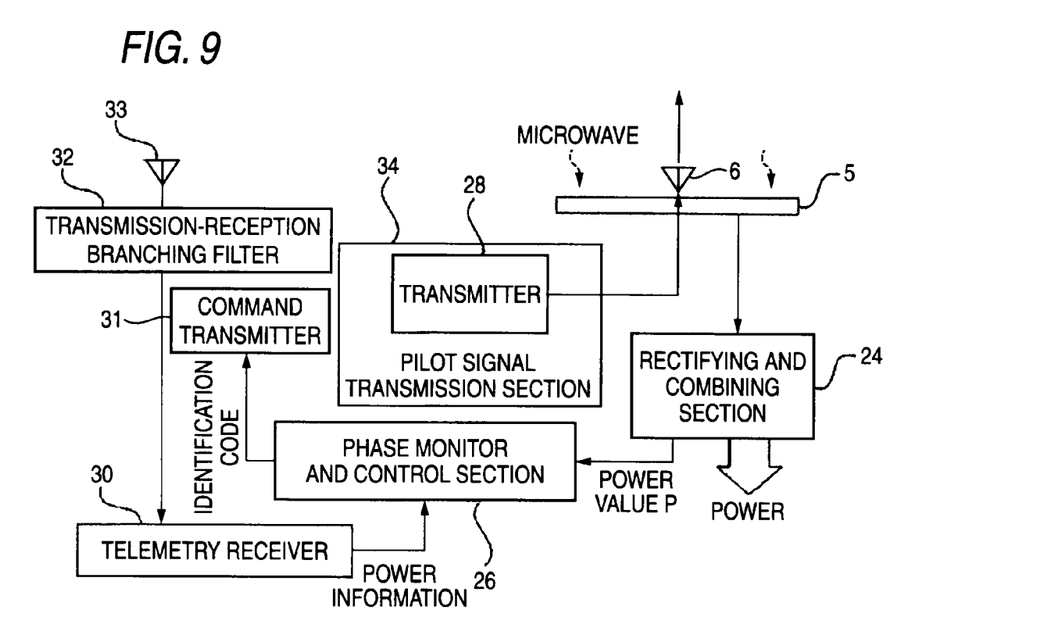
FIG. 9 is a functional block diagram to show the configuration of a rectenna base station according to a third embodiment of the invention.
Figure 10:
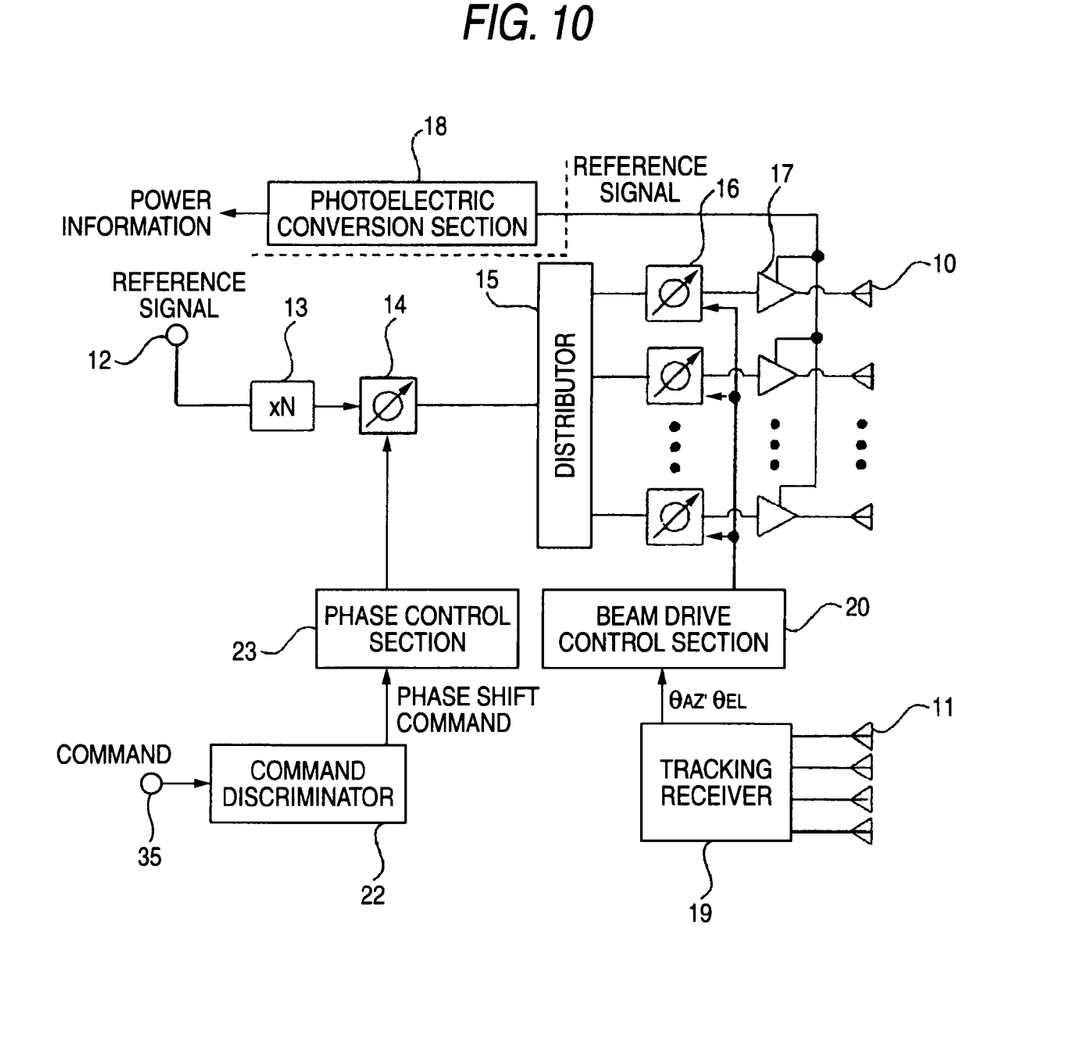
FIG. 10 is a functional block diagram to show the configuration of a power transmitter according to the third embodiment of the invention.

A wireless power transfer system, a power transmitter, and a rectenna base station according to a third embodiment of the invention will be discussed with FIGS. 9 and 10. The rectenna base station according to the third embodiment of the invention transmits a phase change command over a communication line and acquires power information of a power transmitter 2 over a communication line. FIG. 9 is a functional block diagram to show the configuration of the rectenna base station 4 according to the third embodiment of the invention, and FIG. 10 is a functional block diagram to show the configuration of the power transmitter 2 according to the third embodiment of the invention. In FIG. 9, numeral 31 denotes a command transmitter for transmitting a command signal, numeral 32 denotes a diplexer, numeral 33 denotes a communication line transmission-reception antenna, and numeral 34 denotes a pilot signal transmission section for transmitting a pilot signal. Circuits and parts identical with or similar to those previously described with reference to FIG. 5 are denoted by the same reference numerals in FIG. 9. In FIG. 10, numeral 35 denotes an input terminal to which a command signal is input. Circuits and parts identical with or similar to those previously described with reference to FIG. 4 are denoted by the same reference numerals in FIG. 10.

A phase monitor and control section 26 transmits a phase change command signal to each power transmitter 2; it may transmit the command signal over a communication line. In this case, the rectenna base station 4 has the command transmitter 31. When a phase change command (command signal) containing the identification code of the power transmitter 2 is input from the phase monitor and control section 26 to the command transmitter 31, the command transmitter 31 superposes the command signal on a carrier wave of the communication line and transmits the signal to the power transmitter 2 or a control satellite 3 (or a control section 8) through the diplexer 32 and the transmission-reception antenna 33. The power transmitter 2 or the control satellite 3 (or the control section 8) receives the signal and reproduces the command signal. The reproduced command signal is input through the input terminal 35 and a command discriminator 22 makes a comparison between the identification code contained in the command signal and the previously stored identification code and outputs a phase shift command if they match. A phase control section 23 sets the phase of a phase shifter 14.

Power information monitored in a photoelectric conversion section 18 is sent from the power transmitter 2 or the control satellite 3 (or the control section 8) to the rectenna base station 4 using the communication line. In the rectenna base station 4, the power information is received at the transmission-reception antenna 33 and is demodulated and reproduced by a telemetry receiver 30 through the diplexer 32 and is output to the phase monitor and control section 26. The phase monitor and control section 26 can know the power maximum value obtained at the point in time based on the power information and may again set the upper threshold value P1 and the lower threshold value P2 described in the second embodiment.

What is claimed is:

1. A wireless power transfer system comprising:
   a plurality of power transmitters, each of which transmits a microwave; and
   a rectenna base station which receives the microwave to generate power,
   wherein the rectenna base station comprises:
      a rectenna which receives the microwave;
      a pilot signal transmission antenna which transmits a pilot signal to the power transmitters; and
      a phase monitor and control section which specifies an identification code for identifying each power transmitter and generates a command signal to change a phase of the power transmitter specified by identification code so as to increase a power value received at the rectenna, and
   wherein each of the power transmitters comprises:
      a plurality of transmission antenna elements, each of which transmits the microwave to the rectenna base station;
      a pilot signal reception antenna which receives the pilot signal;
      a tracking receiver which detects an arrival direction of the pilot signal received at the pilot signal reception antenna;
      a beam drive control section which performs phase adjustment so that the microwave transmitted from the plurality of transmission antenna elements points in the arrival direction of the pilot signal detected by the tracking receiver; and
      a phase controller which makes phase change of the microwave based on the command signal from the phase monitor and control section of the rectenna base station if the identification code matches a stored identification code.

2. The wireless power transfer system according to claim 1,
   wherein the rectenna base station further comprises a modulator which superposes the command signal on the pilot signal, and
   wherein the power transmitter further comprises a demodulator which reproduces the command signal from the pilot signal received by the tracking receiver.

3. A rectenna base station which receives and combines a microwave transmitted from each of a plurality of power transmitters to generate power, the rectenna base station comprising:
   a rectenna which receives the microwave;
   a pilot signal transmission antenna which transmits a pilot signal to the power transmitters; and
   a phase monitor and control section which specifies an identification code for identifying each of the power transmitters and generates a command signal to change a phase of the power transmitter identified by the identification code so as to increase a power value received at the rectenna.

4. The rectenna base station according to claim 3, further comprising a modulator which superposes the command signal on the pilot signal.

5. A power transmitter which transmits a microwave to a rectenna base station, the power transmitter comprising:
   a plurality of transmission antenna elements, each of which transmits a microwave to the rectenna base station;
   a pilot signal reception antenna which receives a pilot signal from the rectenna base station;
   a tracking receiver which detects an arrival direction of the pilot signal received at the pilot signal reception antenna;

a beam drive control section which performs phase adjustment so that the microwave transmitted from the plurality of transmission antenna elements points in the arrival direction of the pilot signal detected by the tracking receiver; and a phase controller which makes phase change of the microwave based on a command signal, which specifies an identification code and is transmitted from the rectenna base station for changing the phase of the microwave, if the specified identification code matches a stored identification code.

6. The power transmitter according to claim 5, further comprising a demodulator which reproduces the command signal from the pilot signal received by the tracking receiver.

* * * * *